3,458,601
GRAFT COPOLYMERS OF HALOACRYLONITRILE UPON DIENE-ACRYLATE POLYMER

Lee Johnson, Washington, and Ralph P. Arthur and George C. Schweiker, Parkersburg, W. Va., assignors to Borg-Warner Corporation, Chicago, Ill., a corporation of Illinois
No Drawing. Filed Feb. 10, 1967, Ser. No. 615,074
Int. Cl. C08f 15/40
U.S. Cl. 260—879          8 Claims

ABSTRACT OF THE DISCLOSURE

Graft polymers prepared by prepolymerizing a copolymer of alkyl acrylate and conjugated diene and thereafter polymerizing an $\alpha$-haloacrylonitrile in the presence of the prepolymerized copolymer.

BACKGROUND

Prior to this invention, a great variety of graft polymers and copolymers were prepared to serve end uses requiring elastomeric or resinous materials. By graft polymer, it is meant a polymer prepared by polymerizing at least one monomer in the presence of a prepolymerized polymeric backbone. The polymeric backbone may be either a homopolymer or a copolymer. The properties of these graft polymers could be tailored by altering their backbone structure so as to vary from hard, resinous, high impact materials to rubbery elastomeric materials depending upon the type of monomeric ingredients utilized in their preparation. Also, the properties could be varied by varying the amount of monomers utilized in preparing the graft polymers.

Many of the elastomeric graft polymers prepared prior to this invention exhibited poor solvent resistance, poor resistance to oxidation and ultraviolet light and were flammable. It was therefore desirable to obtain a polymeric material that would have all of the desirable properties of graft polymers and additionally, exhibit good chemical stability, good solvent resistance and be non-flammable.

SUMMARY OF THE INVENTION

The present invention is directed to elastomeric and resinous graft polymers prepared by polymerizing at least one monomer selected from the group consisting of $\alpha$-chloroacrylonitrile and $\alpha$-bromoacrylonitrile in the presence of a prepolymerized copolymer of alkyl acrylate-conjugated diene.

The alkyl acrylate-conjugated diene copolymer backbone is preferably ethyl acrylate-butadiene copolymer. However, other monomers may be substituted for the alkyl acrylate as well as the conjugated diene. For example, methyl acrylate, butyl acrylate, propyl acrylate, isopropyl acrylate, pentyl acrylate, cyclopentyl acrylate, hexyl acrylate, isohexyl acrylate, cyclohexyl acrylate, 2-ethylhexyl acrylate, octyl acrylate, 2,2,4-dimethylhexyl acrylate, nonyl acrylate, decyl acrylate, isodecyl acrylate, mixtures thereof and the like may be substituted for the ethyl acrylate. The conjugated diene as mentioned, is preferably butadiene, however, other conjugated dienes such as isoprene, 2,3-dimethyl-1,3-butadiene, piperylene, substituted dienes such as chloroprene and the like may be used in place of the butadiene.

The preferred monomer that is grafted on the alkyl acrylate-conjugated diene backbone polymer is $\alpha$-chloroacrylonitrile, however, $\alpha$-bromoacrylonitrile may also be used. The $\alpha$-chloro and $\alpha$-bromoacrylonitrile are herein referred to as $\alpha$-haloacrylonitrile.

In the preparation of the graft polymers of this invention, the backbone polymer is comprised of from about 90 percent by weight to about 99 percent by weight of alkyl acrylate with the conjugated diene portion correspondingly comprising from about 10 percent by weight to about 1 percent by weight of the copolymer backbone. The grafting monomers may comprise from about 1 percent by weight to about 95 epercent by weight of the total graft polymer with the polymeric backbone comprising from about 99 percent by weight to about 5 percent by weight of the total graft polymer. It has been found that the graft polymers are elastomeric in property when the grafting monomers comprise from about 1 to 50 percent by weight of the total graft polymer and become resinous when the grafting monomers exceed about 50 percent by weight of the total graft polymer. The preferred elastomeric graft polymers of this invention are those wherein the grafting monomer comprises from about 5 to 30 percent by weight of the total graft polymer. It requires at least 1 percent $\alpha$-haloacrylonitrile and preferably 5 percent or more for proper crosslinking of the elastomeric gum stock.

The backbone polymer latex may be prepared by copolymerizing the conjugated diene and alkyl acrylate monomers in an aqueous emulsion in the presence of conventional catalysts, emulsifying agents, etc., at polymerizing temperatures of from about 0° C. to 100° C. The polymerization of the grafting monomers in the presence of the preformed backbone polymer may also take place in aqueous emulsion in the presence of an emulsifying agent and a peroxidic initiator at temperatures of about 0° C. to about 100° C. The grafting monomer or monomers and catalyst may be added to the latex either continuously or incrementally throughout the polymerization.

After the graft polymers are formed, those that are elastomeric polymers may be utilized either as a gum stock or as a cured elastomer. If the elastomer is cured, the conventional curing agents such as lead oxide, mercaptoimidazolines, polyaminesulfur, polyamine-benzothiazyl disulfide, zinc oxide, thiocarbamate salts and the like may be used to cure the acrylic elastomer. The resinous materials are excellent molding compounds.

The compositions of this invention have good high temperature stability, good resistance to oxidation, ultra-violet light, oil and other hydrocarbon solvents. It has been found that certain of the graft polymers of this invention are non-burning, which means that they do not burn at all, while others are self-extinguishing depending on the amount of $\alpha$-haloacrylonitriles grafted on the polymeric backbone. Non-burning, as opposed to self-extinguishing, means that the polymer will not support a flame. Thus, the graft polymers of this invention may be utilized in applications where stringent fire restrictions apply.

This invention will be more clearly understood from a reading of the following examples, which set forth the proportion of exemplary graft polymers prepared from alkyl acrylate-conjugated diene polymer backbones wherein α-haloacrylonitrile is polymerized in the presence of the preformed alkyl acrylate-conjugated diene backbone polymer. In the examples, all parts are by weight unless otherwise indicated.

Example 1

An emulsion was prepared from the following recipe:

| | |
|---|---|
| Deionized water _____ml__ | 300 |
| Nonylphenoxy(polyethoxy)ethyl sodium sulfate _____g__ | 8.0 |
| Potassium persulfate _____g__ | 1.0 |
| Sodium metabisulfite _____g__ | 1.0 |
| Ethyl acrylate _____g__ | 176 |
| Butadiene _____g__ | 4.0 |
| Tetrasodium pyrophosphate _____g__ | 1.2 |

The emulsion was placed in a 32 oz. bottle which was flushed with carbon dioxide, capped and reacted in a thermostatically controlled bath at 55° C. for two hours.

One gram of persulfate was added to the reaction and the reaction was continued for an additional 1.5 hours. 20 g. of α-chloroacrylonitrile monomer was charged to the emulsion and the reaction was continued for four hours at 55° C.

The resultant latex was coagulated in aluminum sulfate solution, washed with deionized water and vacuum dried. The yield was 93.5 percent of a pale-colored graft polymer. The graft polymer formed was compounded on a cold mill in the following formulation, all parts being by weight.

| | Parts |
|---|---|
| Elastomer | 100 |
| Carbon black | 45 |
| Stearic acid | 1 |
| 2-mercaptoimidazoline | 2 |
| Red lead | 5 |

The composition was compression molded at 320° F. for twenty minutes and tempered for six hours at 350° F. in a circulating oven. Specimens were tested using standard ASTM methods and the results of such tests are shown in Table I below.

TABLE I

| | Tempered control | ASTM Oil #3 | Transmission fluid Type A |
|---|---|---|---|
| Tear strength (p.s.i.) | 92 | | |
| Tensile (p.s.i.) | 1,152 | 938 | 1,177 |
| Tensile change, percent | | −18.5 | +1.7 |
| Elongation | 200 | 200 | 175 |
| Elongation change, percent | | 0 | −12.5 |
| Hardness (Shore A) | 74 | 67 | 72 |
| Hardness change (pts.) | | −7 | −2 |
| Volume change, percent | | +17.7 | +8.5 |
| Weight change, percent | | +9.6 | +4.3 |
| Compression set ASTM Method B (solid discs) | 23.9 | | |
| Water resistance 24 hrs. −208° F.: | | | |
| Volume swell percent | 24.7 | | |
| Precipitate | | None | None |

A second curing system was utilized on the graft polymer prepared in Example 1. The graft polymer was compounded on a cold mill in the following formulation, all parts being by weight.

| | |
|---|---|
| Elastomer | 100 |
| Carbon black | 50 |
| High molecular weight polyether ester "TP-95" | 6.0 |
| Zinc oxide | 5.0 |
| Magnesium oxide | 4.0 |
| Methyl "Zimate" (zinc dimethyl dithiocarbonate) | 3.0 |

The composition was compression molded at 330° F. for fourteen minutes, and tempered for six hours at 350° F. in an air circulating oven. Specimens were tested using standard ASTM methods, and the results of such tests are shown in Table II below.

TABLE II

| | Tempered control | ASTM Oil #3 | Transmission fluid Type A |
|---|---|---|---|
| Tear strength (p.s.i.) | 143 | | |
| Tensile (p.s.i.) | 1,550 | 1,574 | 1,564 |
| Tensile change, percent | | +1.5 | +0.9 |
| Elongation | 325 | 280 | 250 |
| Elongation change, percent | | −13.9 | −30.0 |
| Hardness (Shore A) | 80 | 82 | 89 |
| Hardness change (pts.) | | 2.0 | 9.0 |
| Volume change, percent | | 7.4 | 2.1 |
| Precipitate | | None | None |

Example 2

An emulsion was prepared from the following recipe:

| | |
|---|---|
| Deionized water _____ml__ | 300 |
| Sodium lauryl sulfate _____g__ | 8.0 |
| Potassium persulfate _____g__ | 1.0 |
| Sodium metabisulfite _____g__ | 1.0 |
| Butyl acrylate _____g__ | 176 |
| Butadiene _____g__ | 4.0 |
| Tetrasodium pyrophosphate _____g__ | 1.2 |

The polymerization of the recipe was continued as in Example 1 at 55° C. for three hours, at which point 0.1 g. of persulfate, 20 g. of α-chloroacrylonitrile monomer was charged and the reaction continued for an additional four hours.

The latex was coagulated with aluminum sulfate solution, washed with deionized water and vacuum dried to yield 99 percent of a pale colored graft polymer.

Example 3

An emulsion was prepared from the following recipe:

| | |
|---|---|
| Deionized water _____ml__ | 300 |
| Sodium lauryl sulfate _____g__ | 8.0 |
| Potassium persulfate _____g__ | 1.0 |
| Sodium metabisulfite _____g__ | 1.0 |
| Ethyl acrylate _____g__ | 88.0 |
| Butyl acrylate _____g__ | 88.0 |
| Butadiene _____g__ | 4.0 |
| Tetrasodium pyrophosphate _____g__ | 1.2 |

The polymerization of the recipe was continued as in Example 1 at 55° C. for three hours, at which point 0.1 g. of pursulfate and 20 g. of α-bromoacrylonitrile monomer was charged and the reaction continued for an additional four hours.

The latex was coagulated with aluminum sulfate solution, washed with deionized water and vacuum dried to yield 96.5 percent of a pale colored graft polymer.

The graft polymers obtained from Examples 2 and 3 were compounded on a cold mill in the following formulation, all parts being by weight.

| | |
|---|---|
| Rubber | 100 |
| Carbon black | 40 |
| Magnesium oxide | 1.0 |
| Magnesium stearate | 1.0 |
| 2-mercaptoimidazoline | 2.0 |
| Red lead | 5.0 |

The compositions were compression molded at 320° F. for twenty minutes and post cured sixteen hours at 300° C. in an air circulating oven. Specimens were tested using standard ATSM methods, Results are shown in Table III.

TABLE III

| | Product prepared from Example 2 | Product prepared from Example 3 |
|---|---|---|
| Tear strength (p.s.i.) | 47 | 119 |
| Tensile (p.s.i.) | 440 | 470 |
| Elongation | 175 | 250 |
| Hardness (Shore A) | 58 | 61 |

Example 4

An emulsion was prepared from the following recipe:

| | | |
|---|---|---|
| Deionized water | ml | 300 |
| Sodium lauryl sulfate | g | 10.0 |
| Potassium persulfate | g | 1.0 |
| Sodium metabisulfite | g | 1.0 |
| Ethyl acrylate | g | 9.0 |
| Butadiene | g | 1.0 |
| Sodium bicarbonate | g | 0.6 |

The polymerization of the above recipe was continued as in Example 1 at 55° C. for three hours, at which point 190 g. of α-chloroacrylonitrile monomer was charged and the reaction continued for sixteen hours.

The graft polymer was coagulated with aluminum sulfate solution, washed with deionized water and vacuum dried to yield 74 percent of a white resin.

The graft polymer was compression molded at 310° F. to a clear plastic slab. Test specimens were prepared from the molded slabs and were tested using standard ASTM methods. The results of such tests are shown in Table IV.

Table IV

| | |
|---|---|
| Tensile (p.s.i.) | 7,900 |
| Elongation, percent | 4.0 |
| Tensile modulus (p.s.i.) | $5.8 \times 10^5$ |
| Izod impact notched (ft. lbs./in. notch) | 0.6 |
| Rockwell Hardness: | |
| R | 118 |
| L | 104 |
| M | 81 |
| Flammability test on ⅛" x ½" x 6" sample (UL Test Subject 94) | [1] Non-Burning |

[1] Non-burning is defined as not supporting flame as opposed to self-extinguishing, which means that the flame goes out.

Example 5

An emulsion was prepared from the following recipe:

| | | |
|---|---|---|
| Deionized water | ml | 300 |
| Sodium lauryl sulfate | g | 10.0 |
| Potassium persulfate | g | 1.0 |
| Sodium metabisulfite | g | 1.0 |
| Ethyle acrylate | g | 18.0 |
| Butadiene | g | 2.0 |
| Sodium bicarbonate | g | 0.6 |

The polymerization of the recipe was continued as in Example 1 at 55° C. for three hours, at which point 180 g. of α-chloroacrylonitrile monomer was charged and the reaction continued for sixteen hours.

The graft polymer wos coagulated with aluminum sulfate solution, washed with deionized water and vacuum dried to yield 78 percent of a white resin. The resin was molded into a bar and found to be hard, stiff, solvent resistant and non-burning. The Izod impact was 0.6.

Example 6

An emulsion was prepared from the following recipe:

| | | |
|---|---|---|
| Deionized water | ml | 300 |
| Sodium lauryl sulfate | g | 10.0 |
| Potassium persulfate | g | 1.0 |
| Sodium metabisulfite | g | 1.0 |
| Ethyl acrylate | g | 97.8 |
| Butadiene | g | 2.2 |
| Sodium bicarbonate | g | 0.6 |

The polymerization of the recipe was continued as in Example 1 at 55° C. for three hours at which point 100 g. of α-chloroacrylonitrlle monomer was charged and the reaction continued for sixteen hours.

The graft polymer was coagulated with aluminum sulfate solution, washed with deionized water and vacuum dried to yield 100 percent of a white resin. The resin was molded into a bar and was found to be hard, stiff, solvent resistant, and self-extinguishing.

Example 7

An emulsion was prepared from the following recipe:

| | | |
|---|---|---|
| Deionized water | ml | 300 |
| Sodium lauryl sulfate | g | 10.0 |
| Potassium persulfate | g | 1.0 |
| Sodium metabisulfite | g | 1.0 |
| Ethyl acrylate | g | 137 |
| Butadiene | g | 3.0 |
| Sodium bicarbonate | g | 0.6 |

The polymerization of the recipe was continued as in Example 1 at 55° C. for three hours at which point 60 g. of α-chloroacrylonitrile monomer was charged and the reaction continued for sixteen hours.

The graft polymer was coagulated with aluminum sulfate solution, washed with deionized water and vacuum dried to yield 99 percent of a light colored elastomer. The elastomer was molded in a bar and was found to be solvent resistant and self-extinguishing.

Example 8

An emulsion was prepared from the following recipe:

| | | |
|---|---|---|
| Deionized water | ml | 300 |
| Sodium lauryl sulfate | g | 8.0 |
| Potassium persulfate | g | 1.0 |
| Sodium metabisulfite | g | 1.0 |
| Ethyl acrylate | g | 194 |
| Butadiene | g | 4.0 |
| Tetrasodium pyrophosphate | g | 1.1 |

The polymerization of the recipe was continued as in Example 1 at 55° C. for three hours at which point 2.0 g. of α-chloroacrylonitrile monomer was charged and the reaction was continued for four hours.

The graft polymer was coagulated with aluminum sulfate solution, washed with deionized water, and vacuum dried to yield 99 percent of a light colored elastomer. The elastomer was molded into a bar and found to be solvent resistant as well as self-extinguishing.

The examples have illustrated the wide variety of compositions that may be prepared in accordance with this invention and have provided the highly desirable physical properties of these compositions.

It will be understood by those skilled in the art, that the specific embodiments illustrated are by way of examples and are not limitations on this invention. The scope of the invention is defined solely by the appended claims which should be constructed as broadly as is consistent with the prior art.

What is claimed is:

1. A graft copolymer composition prepared by polymerizing from about 1.0 to about 95 percent by weight of at least one α-haloacrylonitrile monomer selected from the group consisting of α-chloroacrylonitrile and α-bromoacrylonitrile in the presence of from about 99 percent by weight to about 5 percent by weight of a prepolymerized backbone copolymer comprised of about 90 to about 99 percent by weight of an alkyl acrylate and correspondingly about 10 to about 1.0 percent by weight of a conjugated diene, the percentages being based on the weight of the total graft copolymer composition.

2. The graft polymer of claim 1 wherein the prepolymerized backbone copolymer is a copolymer of ethyl acrylate and butadiene.

3. The graft polymer of claim 1 wherein the α-haloacrylonitrile grafting monomers comprise from about 1 percent to about 50 percent by weight of the total graft polymer composition and correspondingly the alkyl acrylate-conjugated diene backbone comprises from about 99 percent to about 50 percent by weight of the total graft polymer and wherein the graft polymer is elastomeric in property.

4. The graft polymer of claim 1 wherein the α-haloacrylonitrile grafting monomers comprise from about 95 percent to about 50 percent by weight of the total graft polymer composition and correspondingly the alkyl acrylate-conjugated diene backbone comprises from about 5 percent to about 50 percent by weight of the total graft polymer and wherein the graft polymer is resinous in property.

5. A method of making a graft polymer comprising the steps of:
  polymerizing a mixture of from about 90 to about 99 percent by weight of an alkyl acrylate and about 10 to about 1.0 percent by weight of a conjugated diene to form a copolymer; and
  polymerizing from about 1.0 to about 95 percent by weight of at least one α-haloacrylonitrile selected from the group consisting of α-chloroacrylonitrile and α-bromoacrylonitrile in the presence of from about 99 to about 5 percent by weight of said alkyl acrylate-conjugated diene copolymer to thereby form a graft polymer.

6. The method of claim 5 wherein about 1 percent by weight to about 50 percent by weight α-haloacrylonitrile is polymerized in the presence of about 99 percent to about 50 percent prepolymerized alkyl acrylate-conjugated diene polymer to thereby provide an elastomeric graft polymer.

7. The method of claim 5 wherein about 95 percent to about 50 percent by weight α-haloacrylonitrile is polymerized in the presence of about 5 percent to about 50 percent by weight prepolymerized alkyl acrylate-conjugated diene polymer to thereby provide a resinous graft polymer.

8. The method of claim 5 wherein the alkyl acrylate is ethyl acrylate and the conjugated diene is butadiene, and the α-haloacrylonitrile is α-chloroacrylonitrile.

References Cited
UNITED STATES PATENTS

| | | | |
|---|---|---|---|
| 2,683,162 | 7/1954 | Gleason | 260—465 |
| 2,994,683 | 8/1961 | Calvert | 260—879 XR |
| 3,041,307 | 6/1962 | Baer | 260—876 |

GEORGE F. LESMES, Primary Examiner

U.S. Cl. X.R.

260—29.7, 41.5, 80.7, 83.5